United States Patent
Elias (10) Patent No.: US 8,706,143 B1
(45) Date of Patent: Apr. 22, 2014

(54) DRIVER HANDHELD COMPUTING DEVICE LOCK-OUT

(75) Inventor: John Greer Elias, Townsend, DE (US)

(73) Assignee: Apple Inc., Cupertino, CA (US)

( * ) Notice: Subject to any disclaimer, the term of this patent is extended or adjusted under 35 U.S.C. 154(b) by 920 days.

(21) Appl. No.: 12/334,297

(22) Filed: Dec. 12, 2008

(51) Int. Cl.
*H04W 24/00* (2009.01)
*H04W 48/04* (2009.01)

(52) U.S. Cl.
CPC .................................. *H04W 48/04* (2013.01)
USPC .......................................... 455/456.4; 455/1

(58) Field of Classification Search
CPC ........ H04K 3/42; H04K 3/45; H04K 2203/16
USPC ......... 455/1, 411, 67.11, 550.1, 187.1, 456.1, 455/456.2, 456.3, 404.2, 457, 556.1, 569.2, 455/456.4; 340/461, 670, 545.6
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,415,126 B2 | 8/2008 | Breed et al. | |
| 7,427,024 B1* | 9/2008 | Gazdzinski et al. | 235/384 |
| 7,474,264 B2* | 1/2009 | Bolduc et al. | 342/463 |
| 7,646,312 B2* | 1/2010 | Rosen | 340/937 |
| 7,650,864 B2* | 1/2010 | Hassan et al. | 123/179.2 |
| 7,663,607 B2 | 2/2010 | Hotelling et al. | |
| 7,898,428 B2* | 3/2011 | Dietz et al. | 340/670 |
| 2001/0006886 A1* | 7/2001 | Suzuki | 455/63 |
| 2006/0026521 A1 | 2/2006 | Hotelling et al. | |
| 2006/0097991 A1 | 5/2006 | Hotelling et al. | |
| 2006/0197753 A1 | 9/2006 | Hotelling | |
| 2008/0214211 A1* | 9/2008 | Lipovski | 455/456.4 |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Software Holds Your Calls While You're Driving, Nov. 10, 2008, http://www.msnbc.com/id/27168350.

(Continued)

*Primary Examiner* — David Bilodeau
(74) *Attorney, Agent, or Firm* — Van Court & Aldridge LLP (57) ABSTRACT

Lock-out mechanisms for driver handheld computing devices. The lock-out mechanisms disable the ability of a handheld computing device to perform certain functions, such as texting, while one is driving. In one embodiment, a handheld computing device can provide a lock-out mechanism without requiring any modifications or additions to a vehicle by using a motion analyzer, a scenery analyzer and a lock-out mechanism. In other embodiments, the handheld computing device can provide a lock-out mechanism with modifications or additions to the vehicle, including the use of signals transmitted by the vehicle or by the vehicle key when engaged with the vehicle.

15 Claims, 8 Drawing Sheets

(56) References Cited

U.S. PATENT DOCUMENTS

| | | | |
|---|---|---|---|
| 2009/0082951 A1 | 3/2009 | Graessley | |
| 2010/0234047 A1* | 9/2010 | Lipovski | 455/456.4 |
| 2010/0323657 A1* | 12/2010 | Barnard et al. | 455/404.1 |

OTHER PUBLICATIONS

Ford 'MyKey' to Set Limits on Teen Driving, Nov. 10, 2008, http://www.msnbc.com/id/27053080.

Lee, S.K. et al. (Apr. 1985). "A Multi-Touch Three Dimensional Touch-Sensitive Tablet," *Proceedings of CHI: ACM Conference on Human Factors in Computing Systems,* pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

DRIVER HANDHELD COMPUTING DEVICE LOCK-OUT

FIELD OF THE INVENTION

This relates generally to safe operation of handheld computing devices, and more particularly, to providing a lock-out mechanism to prevent operation of one or more functions of handheld computing devices by drivers when operating vehicles.

BACKGROUND OF THE INVENTION

Texting while driving has become a major concern of parents, law enforcement, and the general public. An April 2006 study found that 80 percent of auto accidents are caused by distractions such as applying makeup, eating, and text messaging on handheld computing devices (texting). According to the Liberty Mutual Research Institute for Safety and Students Against Destruction Decisions, teens report that texting is their number one distraction while driving. Teens understand that texting while driving is dangerous, but this is often not enough motivation to end the practice.

New laws are being written to make texting illegal while driving. However, law enforcement officials report that their ability to catch offenders is limited because the texting device can be used out of sight (e.g., on the driver's lap), thus making texting while driving even more dangerous. Texting while driving has become so widespread it is doubtful that law enforcement will have any significant effect on stopping the practice.

SUMMARY OF THE INVENTION

Lock-out mechanisms for driver handheld computing devices are disclosed. The lock-out mechanisms disable the ability of a handheld computing device to perform certain functions, such as texting, while one is driving.

In one embodiment, a handheld computing device can provide a lock-out mechanism without requiring any modifications or additions to a vehicle. In this embodiment, the handheld computing device can comprise a motion analyzer, a scenery analyzer and a lock-out mechanism. The motion analyzer can detect whether the handheld computing device is in motion beyond a predetermined threshold level. The scenery analyzer can determine whether a holder of handheld computing device is located within a safe operating area of a vehicle. And the lock-out mechanism can disable one or more functions of the handheld computing device based on output of the motion analyzer, and enable the one or more functions based on output of the scenery analyzer.

In other embodiments, the handheld computing device can provide a lock-out mechanism with modifications or additions to the vehicle. In one embodiment, a vehicle and a handheld computing device can provide a lock-out mechanism in which the vehicle, through transmission of a signal, can cause disabled functionality of the handheld computing device to be enabled. In another embodiment, a vehicle can unilaterally provide a lock-out mechanism by transmitting blocking signals to an unsafe operating area of the vehicle. In a further embodiment, a vehicle key and a handheld computing device can provide a lock-out mechanism in which the key transmits a signal when engaged with the vehicle. In yet another embodiment, a vehicle and a handheld computing device can provide a lock-out mechanism in which the vehicle transmits a signal notifying the handheld computing device to disable functionality.

DETAILED DESCRIPTION OF THE PREFERRED EMBODIMENTS

In the following description of preferred embodiments, reference is made to the accompanying drawings where it is shown by way of illustration specific embodiments in which the invention can be practiced. It is to be understood that other embodiments can be used and structural changes can be made without departing from the scope of the embodiments of this invention.

Embodiments of the invention relate to disabling the ability of a handheld computing device to perform certain functions, such as texting, while one is driving. An opportunity exists for handheld computing device makers to put into place a lock-out mechanism to disable the input and, possibly, the reception of text messages while the user is driving. The achievement of such a mechanism may be a significant selling point in the eyes of concerned parents, and it could lead to legislation that would require all handheld computing devices to disable texting while driving.

Although some embodiments of this invention may be described and illustrated herein in terms of a lock-out mechanism to disable text messaging, it should be understood that embodiments of this invention are not so limited, but are generally applicable to disabling any function of a handheld computing device that may interfere with the safe operation of a vehicle by a driver, such as receiving or placing cellular telephone calls without a hands-free device, for example. Further, although some embodiments of this invention may be described and illustrated herein in the context of an automobile, it should be understood that embodiments of this invention are not so limited, but are generally applicable to any vehicle, such as trains or airplanes, for example.

Figure 1:
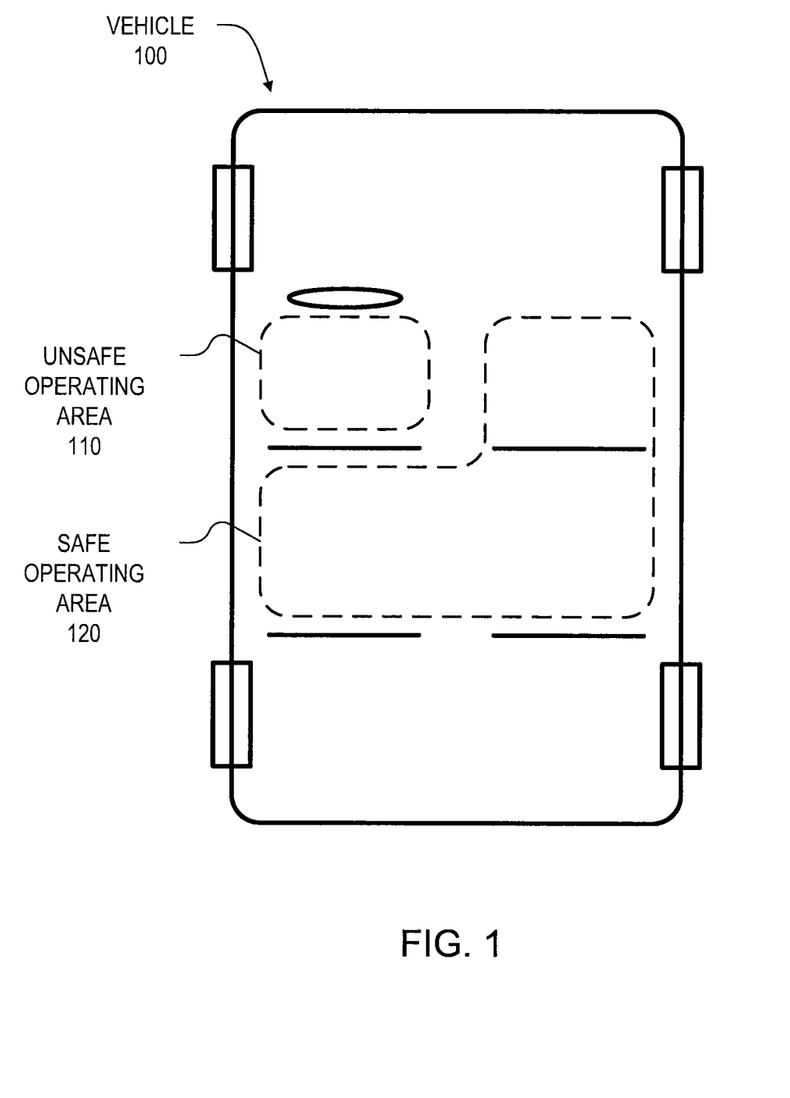
FIG. 1 illustrates an exemplary vehicle with unsafe and safe operating areas according to one embodiment of the invention.

FIG. 1 illustrates vehicle 100 with unsafe operating area 110 and safe operating area 120. In the embodiment illustrated in FIG. 1, vehicle 100 depicts an automobile, the four horizontal lines depict the backs of seats in vehicle 100, and the oval depicts a steering wheel. Unsafe operating area 110 depicts the driver compartment area comprising interior vehicle space devoted to the driver of vehicle 100. In this embodiment, the driver compartment area is considered unsafe for operating one or more functions of a handheld computing device during operation of vehicle 100. Safe operating area 120 depicts the passenger compartment area comprising interior vehicle space devoted to passengers of vehicle 100. In this embodiment, the passenger compartment area is considered safe for operating one or more functions of a handheld computing device during operation of vehicle 100. Embodiments of the invention are directed to disabling one of more functions of a handheld computing device held by a user while the user is operating vehicle 100 (e.g., driving the automobile), but enabling the functions of a handheld computing device held by a user riding along in vehicle 100 as a passenger.

It should be noted that the designation of a vehicle area as unsafe or safe for the purpose of operating one or more functions of a handheld computing device may differ according to vehicle type and safety considerations, and is not limited to the designations described and illustrated herein.

Figure 2:
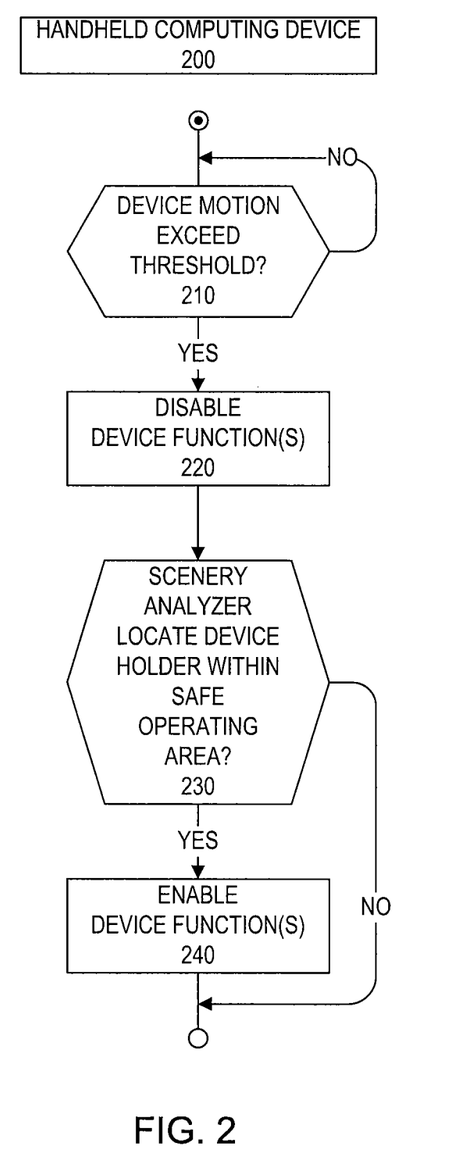
FIG. 2 illustrates an exemplary process in which a handheld computing device can provide a lock-out mechanism according to one embodiment of the invention.

FIG. 2 illustrates a process in which handheld computing device 200 can provide a lock-out mechanism without requiring any modifications or additions to vehicle 100. In particular, in the embodiment illustrated in FIG. 2, handheld computing device 200 can comprise a motion analyzer, a scenery analyzer and a lock-out mechanism. The motion analyzer can be configured to detect whether handheld computing device 200 is in motion beyond a predetermined threshold level (block 210). The scenery analyzer can be configured to determine whether a holder of handheld computing device 200 is located within safe operating area 120 of vehicle 100 (block 230). The lock-out mechanism can be configured to disable (block 220) one or more functions of handheld computing device 200 based on output of the motion analyzer, and enable (block 240) the one or more functions of handheld computing device 200 based on output of the scenery analyzer.

For example, the lock-out mechanism can be configured to disable the one or more functions of handheld computing device 200 when the output of the motion analyzer indicates that handheld computing device 200 is in motion beyond a predetermined threshold level (e.g., speed). This can prevent handheld computing device 200 from being disabled when the user of the device is walking with the device rather than driving with it. And the lock-out mechanism can be configured to enable the one or more functions of handheld computing device 200 after output of the scenery analyzer indicates that the holder of handheld computing device 200 is within safe operating area 120 of vehicle 100. This can enables passengers in moving vehicles to operate handheld computing device 200 without one or more of its functions being disabled.

In one embodiment, the lock-out mechanism can be configured to enable the one or more functions of handheld computing device 200 for a predetermined period of time. In another embodiment, the lock-out mechanism can be configured to enable the one or more functions of handheld computing device 200 for a predetermined number of operations associated with the one or more functions of handheld computing device 200 (e.g., the sending or receiving of a predetermined number or text messages).

The motion analyzer can utilize any suitable mechanism to detect whether handheld computing device 200 is in motion, such as GPS data and/or cellular telephone signals (e.g., based on changing base station signals and/or signal strength). If handheld computing device 200 has an accelerometer, accelerometer motion based on output of the accelerometer can be used to detect whether handheld computing device 200 is in motion. If handheld computing device 200 has a light sensor, changing light conditions based on output of the light sensor can be used to detect whether handheld computing device 200 is in motion.

The scenery analyzer can be configured to determine whether a holder of handheld computing device 200 is located within safe operating area 120 of vehicle 100 based on picture data or video data if handheld computing device 200 has a camera. For example, the holder of the device can be required to pan the camera around the vehicle (e.g., 360 degrees), so that the camera can take either a series of pictures or a video. The picture/video data can be digitally analyzed by scenery analysis programming in handheld computing device 200 to determine if the holder of the device is deemed to be in safe operating area 120.

The scenery analysis programming can be based on any suitable algorithm. In one embodiment, for example, the algorithm may specify that if the picture/video data shows only one face and a vehicle operating mechanism (e.g., a steering wheel in an embodiment in which the vehicle is an automobile) in separate images, then it may be determined that the holder of the device is in a driver compartment area of the vehicle (e.g., such as in the driver seat within unsafe operating area 110 of vehicle 100). The algorithm may also specify that if the picture/video data shows more than one face and a vehicle operating mechanism, with one of the faces and the vehicle operating mechanism in one image or video frame, then it may be determined that the holder of the device is not in the driver compartment area of the vehicle, but rather in a passenger compartment area of the vehicle (e.g., such as in the front passenger seat within safe operating area 120 of vehicle 100). Further, the algorithm may specify that if the picture/video data does not show a vehicle operating mechanism, then it may be determined that the holder of the device is in a passenger compartment area of the vehicle (e.g., such as in a rear seat within safe operating area 120 of vehicle 100, or in a passenger compartment area in some other form of transportation, such as a train). In order to prevent the holder of handheld computing device 200 from tilting the camera in different ways during a panning operation (e.g., to avoid capturing an image of the vehicle operating mechanism if the holder is in a driver compartment area of a vehicle), the scenery analysis programming can use accelerometer output to ensure that level and proper panning is implemented.

Figure 3:
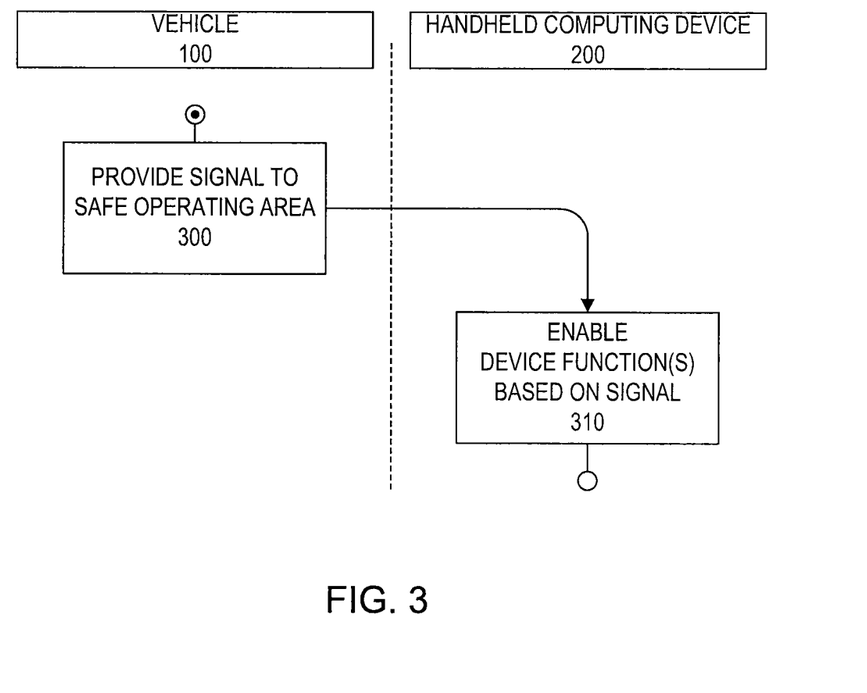
FIG. 3 illustrates an exemplary process in which a vehicle and a handheld computing device can provide a lock-out mechanism according to one embodiment of the invention.

FIGS. 3-6 illustrate processes in which handheld computing device 200 can provide a lock-out mechanism with modifications or additions to vehicle 100. FIG. 3, for example, illustrates a process in which vehicle 100 and handheld computing device 200 can provide a lock-out mechanism in which vehicle 100 can cause disabled functionality of handheld computing device 200 (e.g., due to motion of handheld computing device 200) to be enabled. In this process, vehicle 100 can include a transmitter configured to provide a signal to safe operating area 120 (block 300). Handheld computing device 200 can be configured to enable one or more of its functions (e.g., a text messaging function) based on the signal (block 310). The transmitter can be located in any suitable location in vehicle 100 as long as the transmission signal only reaches safe operating area 120 and not unsafe operating area 110. In this embodiment, the transmission signal may be used instead of scenery analysis to verify that the holder of handheld computing device 200 is within safe operating area 120 when in motion beyond a predetermined threshold level.

Figure 4:
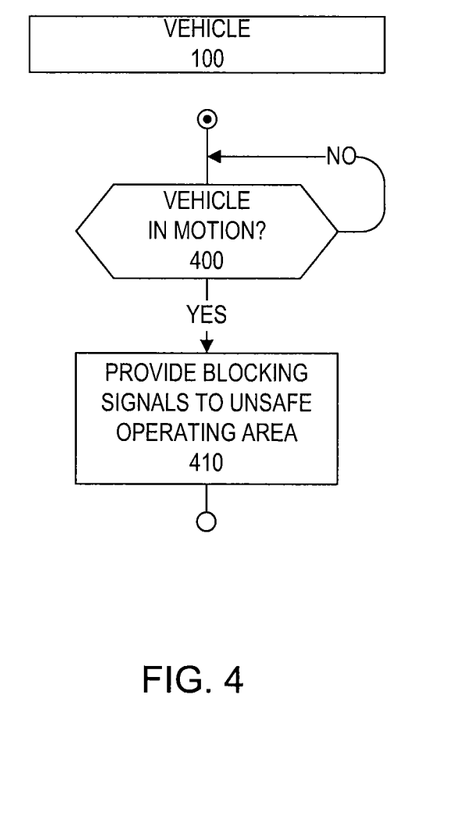
FIG. 4 illustrates an exemplary process in which a vehicle can provide a lock-out mechanism according to one embodiment of the invention.

FIG. 4 illustrates a process in which vehicle 100 can unilaterally provide a lock-out mechanism. For example, vehicle 100 can include a transmitter configured to provide one or more radio frequency blocking signals to unsafe operating area 110 of vehicle 100 (block 410) when vehicle 100 determines that it is in motion (e.g., being driven) (block 400). The blocking signals can be tuned to the frequencies utilized by handheld computing device 200 for operating a function intended to be disabled by the lock-out mechanism (e.g., such as sending or receiving cellular phone calls or text messages). The transmitter can be located in any suitable location in vehicle 100 as long as the blocking signals only reach unsafe operating area 110 and not safe operating area 120. In this manner, handheld computing device 200 need not be altered or modified to have its functionality disabled when in motion in vehicle 100. Vehicle 100 can initiate the blocking signals whenever it detects itself in motion, for example.

Figure 5:
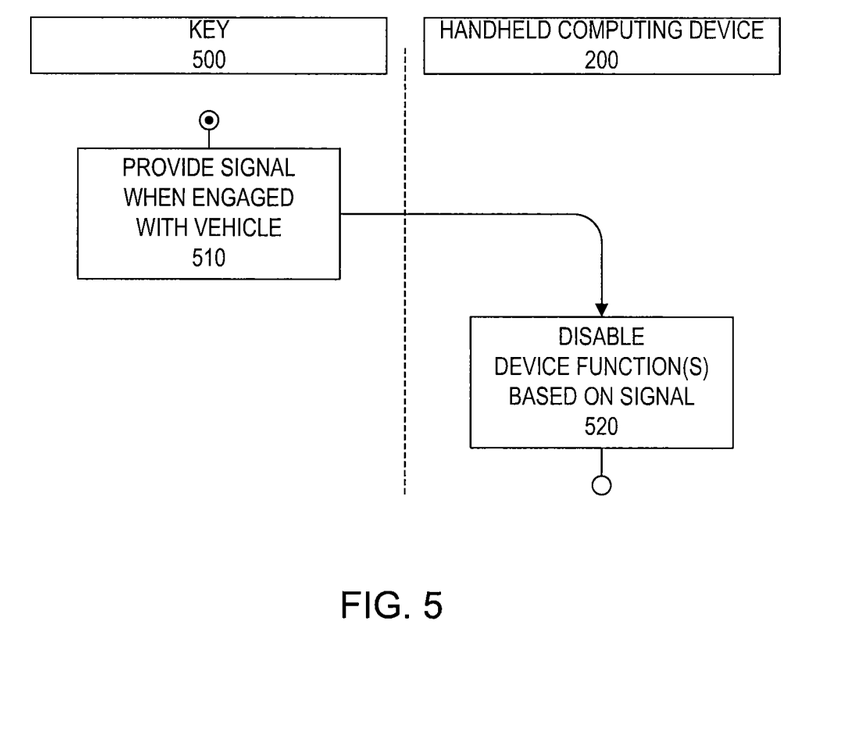
FIG. 5 illustrates an exemplary process in which a vehicle key and a handheld computing device can provide a lock-out mechanism according to one embodiment of the invention.

FIG. 5 illustrates a process in which a vehicle key and handheld computing device 200 can provide a lock-out mechanism. In this process, a key can be configured to enable operation of vehicle 100 and provide a signal when engaged with vehicle 100 (block 510). The key can be engaged with vehicle 100, for example, when it is in the keyhole and turned, or, in the case of a wireless ignition key, when it is in proximity to vehicle 100 such that it can enable operation of vehicle 100. Handheld computing device 200 can be configured to disable one or more functions of the handheld computing device based on the signal (block 520). In this embodiment, a registration system can be implemented to allow concerned parents to register such vehicle keys with a particular handheld computing device utilized by their children in order to ensure safe driving habits in the automobiles driven by the children under supervision by the parents.

Figure 6:
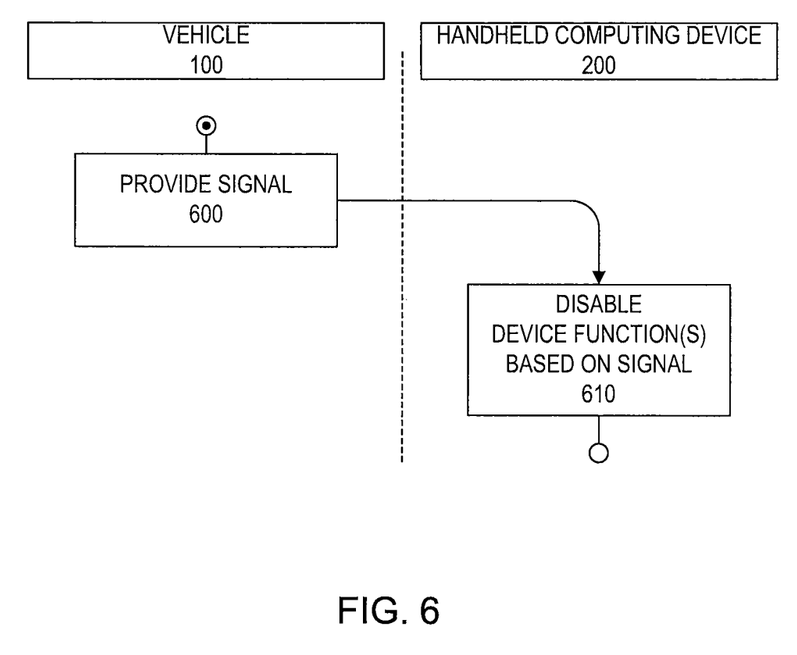
FIG. 6 illustrates an exemplary process in which a vehicle and a handheld computing device can provide a lock-out mechanism according to one embodiment of the invention.

FIG. 6 illustrates a process in which a vehicle and a handheld computing device can provide a lock-out mechanism in which vehicle 100 can cause functionality of handheld computing device 200 to be disabled in coordination with handheld computing device 200. In this process, vehicle 100 can include a transmitter configured to provide a signal (block 600), and handheld computing device 200 can comprise a receiver configured to disable one or more of its functions based on the signal (block 610). In one embodiment, vehicle 100 can be configured to detect whether handheld computing device 200 is in proximity to vehicle 100, and provide the signal to handheld computing device 200 when vehicle 100 detects handheld computing device 200 is in proximity to vehicle 100. Vehicle 100 may detect the proximity of handheld computing device 200 in any suitable way, such as via radio frequency identification (RFID), for example, wherein handheld computing device 200 is provided with an RFID tag.

Figure 7:
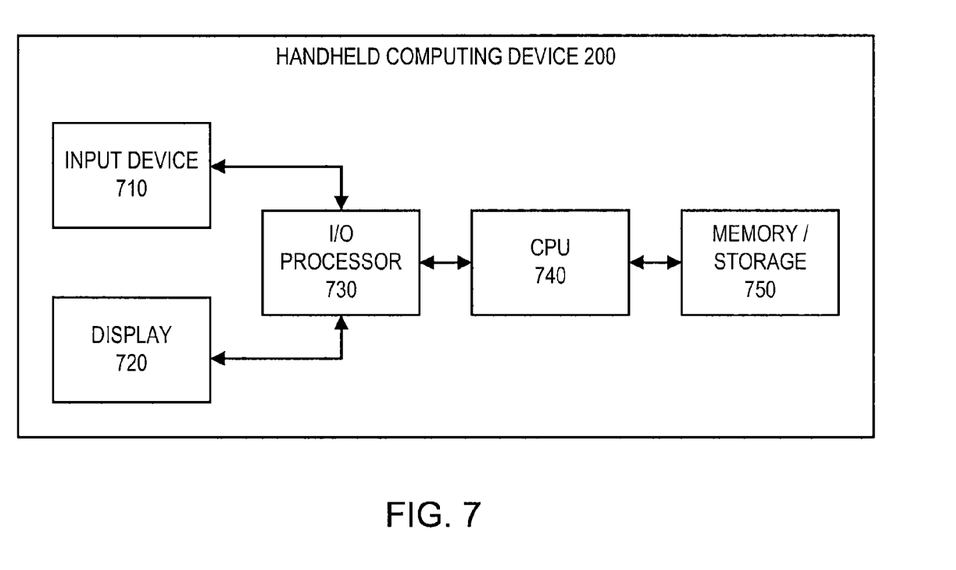
FIG. 7 illustrates an exemplary handheld computing device according to embodiments of the invention.

FIG. 7 illustrates exemplary handheld computing device 200 that can include one or more of the embodiments of the invention described above. Handheld computing device 200 can include input device 710, display 720, I/O processor 730, central processing unit (CPU) 740 and memory/storage 750. Programming for processing the input as described above may be stored in memory/storage 750 of handheld computing device 200, which may include solid state memory (RAM, ROM, etc.), hard drive memory, and/or other suitable memory or storage. CPU 740 may retrieve and execute the programming to process the input received through input device 710, which may include a camera, an accelerometer and a light sensor as described above and/or other input devices not shown. Through the programming, CPU 740 can receive outputs from input device 710 and perform actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, receiving a text message, sending a text message, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. CPU 740 can also perform additional functions that may not be related to input device processing, and can be coupled to memory/storage 750 and display 720, which may include a liquid crystal display (LCD) for example, for providing a user interface (UI) to a user of the device.

Note that one or more of the functions described above can be performed by firmware stored in a memory (not shown) associated with I/O processor 730 and executed by I/O processor 730, or stored in memory/storage 750 and executed by CPU 740. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store a program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 8A:
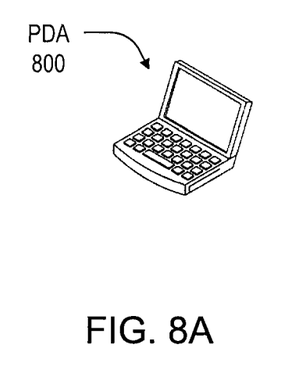
FIG. 8A illustrates an exemplary personal digital assistant (PDA) providing a lock-out mechanism according to an embodiment of the invention.
Figure 8B:
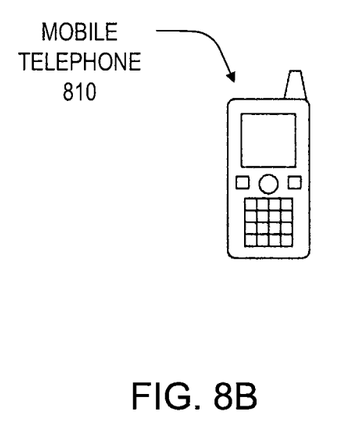
FIG. 8B illustrates an exemplary mobile telephone providing a lock-out mechanism according to an embodiment of the invention.

Handheld computing device 200 can be any of a variety of types such as those illustrated in FIGS. 8A-8B, for example. FIG. 8A illustrates exemplary PDA 800 that can provide a lock-out mechanism according to an embodiment of the invention. FIG. 8B illustrates exemplary mobile telephone 810 that can provide a lock-out mechanism according to an embodiment of the invention. Additionally, handheld computing device 200 may be a combination of these types. For example, in one embodiment handheld computing device 200 may be a device that is a combination of PDA 800 and mobile telephone 810. The PDA and mobile telephone of FIGS. 8A-8B can prevent the dangerous practice of operating a handheld computing device in certain ways while driving by providing a lock-out mechanism according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A handheld computing device comprising:
   a motion analyzer configured to detect whether the handheld computing device is in motion beyond a predetermined threshold level;
   a scenery analyzer configured to determine whether the handheld computing device is located within a safe operating area of a vehicle based on at least one of picture data and video data; and
   a lock-out mechanism configured to automatically and selectively disable one or more functions of the handheld computing device based on outputs from the motion analyzer and the scenery analyzer.

2. The handheld computing device of claim 1, wherein the lock-out mechanism is configured to disable the one or more functions of the handheld computing device when the output of the motion analyzer indicates that the handheld computing device is in motion beyond the predetermined threshold level.

3. The handheld computing device of claim 2, wherein the lock-out mechanism is configured to enable the one or more functions of the handheld computing device after output of the scenery analyzer indicates that the holder of the handheld computing device is located within the safe operating area of the vehicle.

4. The handheld computing device of claim 3, wherein the lock-out mechanism is configured to enable the one or more functions of the handheld computing device for a predetermined period of time.

5. The handheld computing device of claim 3, wherein the lock-out mechanism is configured to enable the one or more functions of the handheld computing device for a predetermined number of operations associated with the one or more functions of the handheld computing device.

6. The handheld computing device of claim 1, wherein the motion analyzer is configured to detect whether the handheld computing device is in motion based on GPS data.

7. The handheld computing device of claim 1, wherein the motion analyzer is configured to detect whether the handheld computing device is in motion based on cellular telephone signals.

8. The handheld computing device of claim 1, wherein the handheld device further comprises an accelerometer, and the motion analyzer is configured to detect whether the handheld computing device is in motion based on output of the accelerometer.

9. The handheld computing device of claim 1, wherein the handheld device further comprises a light sensor, and the motion analyzer is configured to detect whether the handheld computing device is in motion based on output of the light sensor.

10. The handheld computing device of claim 1, wherein the one or more functions of the handheld computing device includes a text messaging function.

11. A method comprising:
    detecting using a handheld computing device whether the handheld computing device is in motion beyond a predetermined threshold level;
    determining using the handheld computing device whether the handheld computing device is located within a safe operating area of a vehicle based on at least one of picture data and video data; and
    automatically and selectively disabling using the handheld computing device one or more functions of the handheld computing device when both the handheld computing device is detected to be in motion beyond the predetermined threshold level and the handheld computing device is determined not to be located within the safe operating area of the vehicle.

12. The method of claim 11, wherein the one or more functions are configured to be enabled for a predetermined period of time.

13. The method of claim 11, wherein the one or more functions are configured to be enabled for a predetermined number of operations associated with the one or more functions of the handheld computing device.

14. The method of claim 11, wherein the one or more functions of the handheld computing device includes a text messaging function.

15. A mobile telephone comprising:
    a motion analyzer configured to detect whether the mobile telephone is in motion beyond a predetermined threshold level;
    a scenery analyzer configured to determine whether the mobile telephone is located within a safe operating area of a vehicle based on at least one of picture data and video data; and
    a lock-out mechanism configured to automatically and selectively disable one or more functions of the mobile telephone based on outputs from the motion analyzer and the scenery analyzer.

\* \* \* \* \*